United States Patent
Hirai (10) Patent No.: US 6,813,436 B1
(45) Date of Patent: Nov. 2, 2004

(54) RECORDING APPARATUS, RECORDING METHOD AND RECORDING MEDIUM FOR PREVENTING ILLEGAL DUPLICATION

(75) Inventor: Jun Hirai, Tokyo (JP)

(73) Assignee: Sony Corporation, Tokyo (JP)

( * ) Notice: Subject to any disclaimer, the term of this patent is extended or adjusted under 35 U.S.C. 154(b) by 912 days.

(21) Appl. No.: 09/650,397

(22) Filed: Aug. 29, 2000

(30) Foreign Application Priority Data

Aug. 30, 1999 (JP) .......................................... P11-243457

(51) Int. Cl.[7] .............................................. H04N 5/91
(52) U.S. Cl. ............................ 386/94; 396/52; 380/201
(58) Field of Search .............................. 386/83, 52, 94; 380/201

(56) References Cited

U.S. PATENT DOCUMENTS

| | | | |
|---|---|---|---|
| 6,434,322 B1 * | 8/2002 | Kimura et al. ................. | 386/94 |
| 6,700,989 B1 * | 3/2004 | Itoh et al. ..................... | 382/100 |
| 2001/0019659 A1 * | 9/2001 | Hirai ............................. | 386/83 |
| 2003/0118181 A1 * | 6/2003 | Miwa et al. .................. | 380/201 |
| 2003/0231869 A1 * | 12/2003 | Kitani ........................... | 386/94 |

FOREIGN PATENT DOCUMENTS

| | | | |
|---|---|---|---|
| EP | 0 643 391 | 3/1995 | |
| EP | 0 703 576 | 3/1996 | |
| EP | 0 704 844 | 4/1996 | |
| EP | 0 778 566 | 6/1997 | |
| EP | 0 822 550 | 2/1998 | |
| EP | 0 855 836 | 7/1998 | |
| EP | 0 863 506 | 9/1998 | |
| EP | 0 878 794 | 11/1998 | |
| EP | 1 020 857 | 7/2000 | |
| JP | 0704844 A1 * | 3/1996 | ........... G11B/20/00 |

OTHER PUBLICATIONS

Patent Abstracts of Japan vol. 1996, No. 04, Apr. 30, 1996 & JP 07 326130 A (Sharp Corp), Dec. 12, 1995.

Patent Abstracts of Japan vol. 016 No. 562 (P–1456), Dec. 3, 1992 & JP 04 215153 A (Matsushita Electric Ind Co Ltd), Aug. 5, 1992.

* cited by examiner

*Primary Examiner*—Thai Tran
*Assistant Examiner*—Alicia M Duggins
(74) *Attorney, Agent, or Firm*—Frommer Lawrence & Haug LLP; William S. Frommer; Bruno Polito

(57) ABSTRACT

A digital watermark detection circuit detects a digital watermark inserted in an input signal. When the digital watermark detection circuit detects a digital watermark indicating the prohibition of duplication, a record controlling circuit controls a recording circuit and a recording drive to stop recording and prohibit recording to a recording medium for a predetermined time.

15 Claims, 6 Drawing Sheets

FIG. 4

RECORDING APPARATUS, RECORDING METHOD AND RECORDING MEDIUM FOR PREVENTING ILLEGAL DUPLICATION

BACKGROUND OF THE INVENTION

1. Field of the Invention

The present invention relates to a recording apparatus, a recording method and a recording medium, in particular, relates to a recording apparatus, a recording method and a recording medium capable of preventing illegal duplication surely.

2. Description of the Related Art

Systems for controlling duplication recording such as Serial Copy Management System (SCMS), Copy Generation Management System (CGMS)-A, or CGMS-D are utilized for preventing illegal duplication of data concerning a video signal or an audio signal, or a program.

In addition, the so-called digital watermarking technique (electronic watermarking technique), in which a predetermined data is superimposed on an analog signal or a digital data of a video, an audio or the like, has begun to be utilized. The digital watermarking technique is a technique for embedding a signal of a frequency or a level incognizable for a human being in a part, which is not important for human perception, of the analog signal or the digital data signal.

It is conceivable that the information of SCMS, CGMS-A and CGMS-D, which is additional information for protecting copyright, is embedded in a signal of a video or an audio by utilizing the digital watermarking technique.

However, a period of time necessary for detecting a digital watermark (an electronic watermark) is longer than a period of time for detecting a data in a header of the digital data for managing duplication. Moreover, a period of time for processing the detection of the digital watermark is not fixed for diminishing erroneous operations. For example, if it takes more than ten seconds to process the detection of the digital watermark, signals or data of a video or an audio, the duplication of which is prohibited, can be duplicated by repeating the duplication within ten seconds.

That is, if a system where the duplication is repeated within a period of time necessary for processing the detection of a digital watermark is produced, the duplication of a signal or a data in which the digital watermark is inserted can easily be done.

SUMMARY OF THE INVENTION

The present invention is done in consideration of such a situation, and aims to provide a recording apparatus, a recording method and a recording medium capable of preventing illegal duplication surely, even if a predetermined period of time is required for processing the detection of a signal or a data managing the duplication.

A detecting means can detect a digital watermark as a duplication controlling signal.

A record controlling means controls a recording means to eject an information recording medium from a recording apparatus when the detecting means detects the duplication controlling signal indicating prohibition of duplication.

The record controlling means controls the recording means to release the prohibition of recording when the information recording medium is ejected from said recorder.

The record controlling means controls the recording means to set a signal recorded in the information recording medium from beginning of recording to stopping of the recording to prohibition of reproducing when the detecting means detects the duplication controlling signal indicating prohibition of duplication.

The recorder further comprises discontinuity finding means for finding a discontinuity of an input signal after recording begins, wherein the record controlling means controls the recording means to set a signal recorded in the information recording medium from a point of time when the discontinuity is found to stopping of recording to prohibition of reproducing when the detecting means detects the duplication controlling signal indicating prohibition of duplication.

The record controlling means controls the recording means to erase a signal recorded in the information recording medium from beginning of recording to stopping of the recording when the detecting means detects the duplication controlling signal indicating prohibition of duplication.

The recording apparatus further comprises discontinuity finding means for finding a discontinuity of the input signal after recording has begun, wherein the record controlling means controls the recording means to erase a signal recorded in the information recording medium from a point of time when the discontinuity was found to stopping of recording when the detecting means detects the duplication controlling signal indicating prohibition of duplication.

A method for recording according to an embodiment of the present invention, comprises the steps of: detecting a duplication controlling signal for controlling duplication that is inserted in an input signal; and controlling a step of recording to stop recording when the duplication controlling signal indicating prohibition of duplication is detected in the process of the step of detecting and then to prohibit recording on an information recording medium for a predetermined time.

A program of an recording medium according to another embodiment of the invention comprises the steps of: detecting a duplication controlling signal for controlling duplication in an input signal; and controlling a step of recording to stop recording when the duplication controlling signal indicating prohibition of duplication is detected in the process of the step of detecting and then to prohibit recording on an information recording medium for a predetermined time.

In a recorder, a method for recording and a recording medium according to other embodiments of the invention, a duplication controlling signal inserted in an input signal for controlling duplication is detected, and a recording means is controlled to stop recording when the duplication controlling signal indicating prohibition of duplication is detected, and further is controlled to prohibit recording into an information recording medium for a predetermined time.

The recorder, the method for recording and the recording medium according to the embodiments of the invention can consequently prevent illegal duplication surely, even if a predetermined period of time is required for the detection of the duplication controlling signal.

BRIEF DESCRIPTION OF THE DRAWINGS

The above and other objects, features and advantages of the present invention will become more apparent from the following description of the presently preferred exemplary embodiments of the invention taken in conjunction with the accompanying drawings, in which.

DESCRIPTION OF THE PREFERRED EMBODIMENTS

Figure 1:
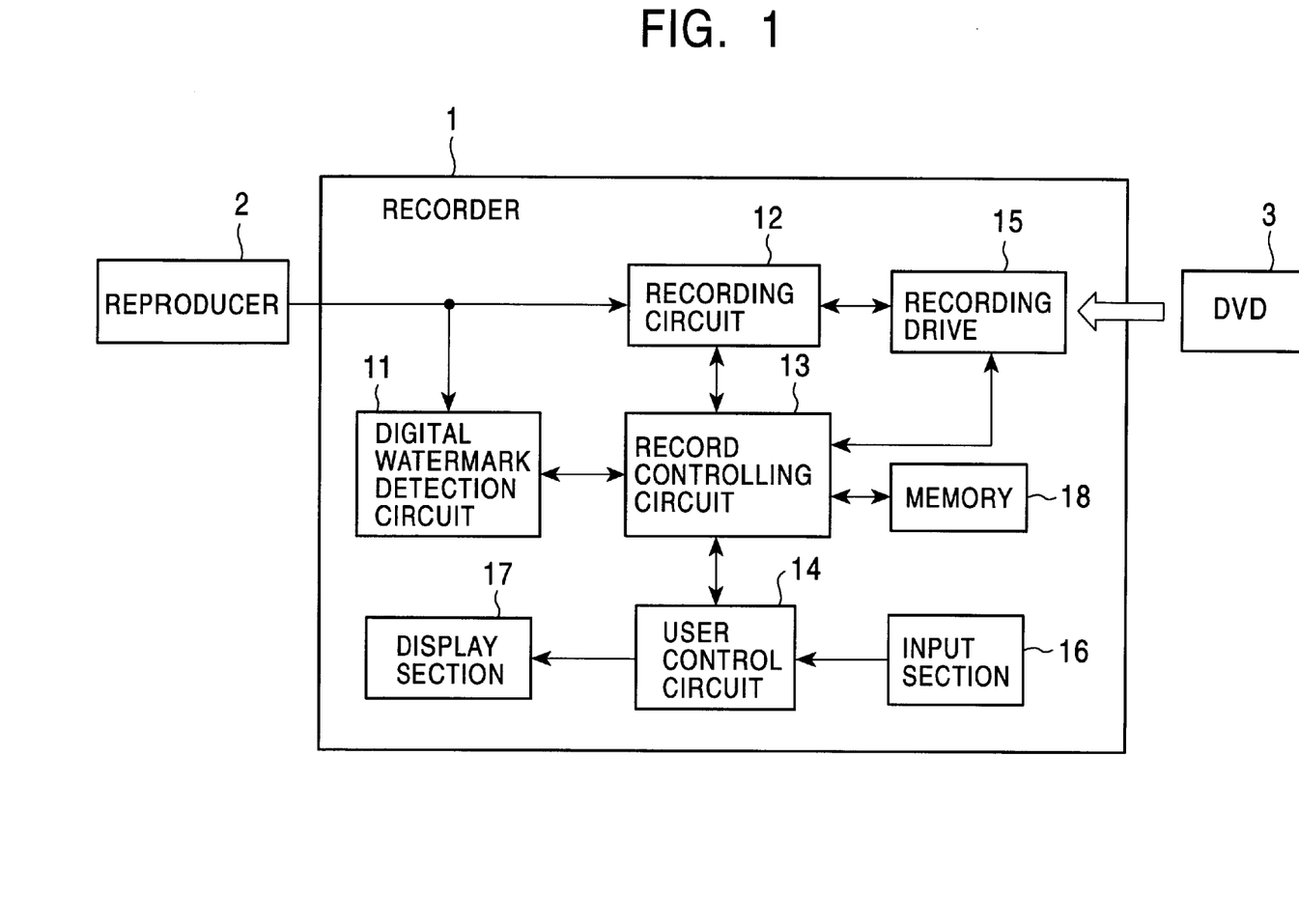
FIG. 1 is a block diagram showing the structure of an embodiment of a recording system according to the present invention.

FIG. 1 is a block diagram showing the structure of an embodiment of a recording system according to the present invention. In FIG. 1, a reproducer 2 supplies an analog signal of a video signal, an audio signal or the like to a recorder 1. A digital watermark the spectrum of which is diffused and a predetermined value is set therein is inserted in the analog signal. The recorder 1 receives the analog signal of a video signal, an audio signal or the like supplied by the reproducer 2.

The recorder 1 transforms the received analog signal to a digital data in a predetermined format, and records the transformed digital data in a recording medium 3 such as Digital Versatile Disc (DVD) loaded in the recorder 1. As the recording medium 3, a Mini Disc™ (MD), an optical disk such as CD-R, and a semiconductor memory such as a Memory Stick™ are usable. The analog signal inputted into the recorder 1 is supplied to a digital watermark detection circuit 11 and a recording circuit 12.

The digital watermark detection circuit 11 detects the digital watermark inserted into the supplied analog signal. The digital watermark detection circuit 11 outputs a duplication controlling signal for stopping recording to a record controlling circuit 13 when the detected digital watermark has a value indicating the prohibition of duplication. The digital watermark detection circuit 11 outputs a duplication controlling signal indicating the continuation of recording, i.e. indicating not stopping recording, to the record controlling circuit 13 when the digital watermark is not detected from the supplied analog signal, or when the detected digital watermark has a value indicating that duplication is possible.

Figure 2:
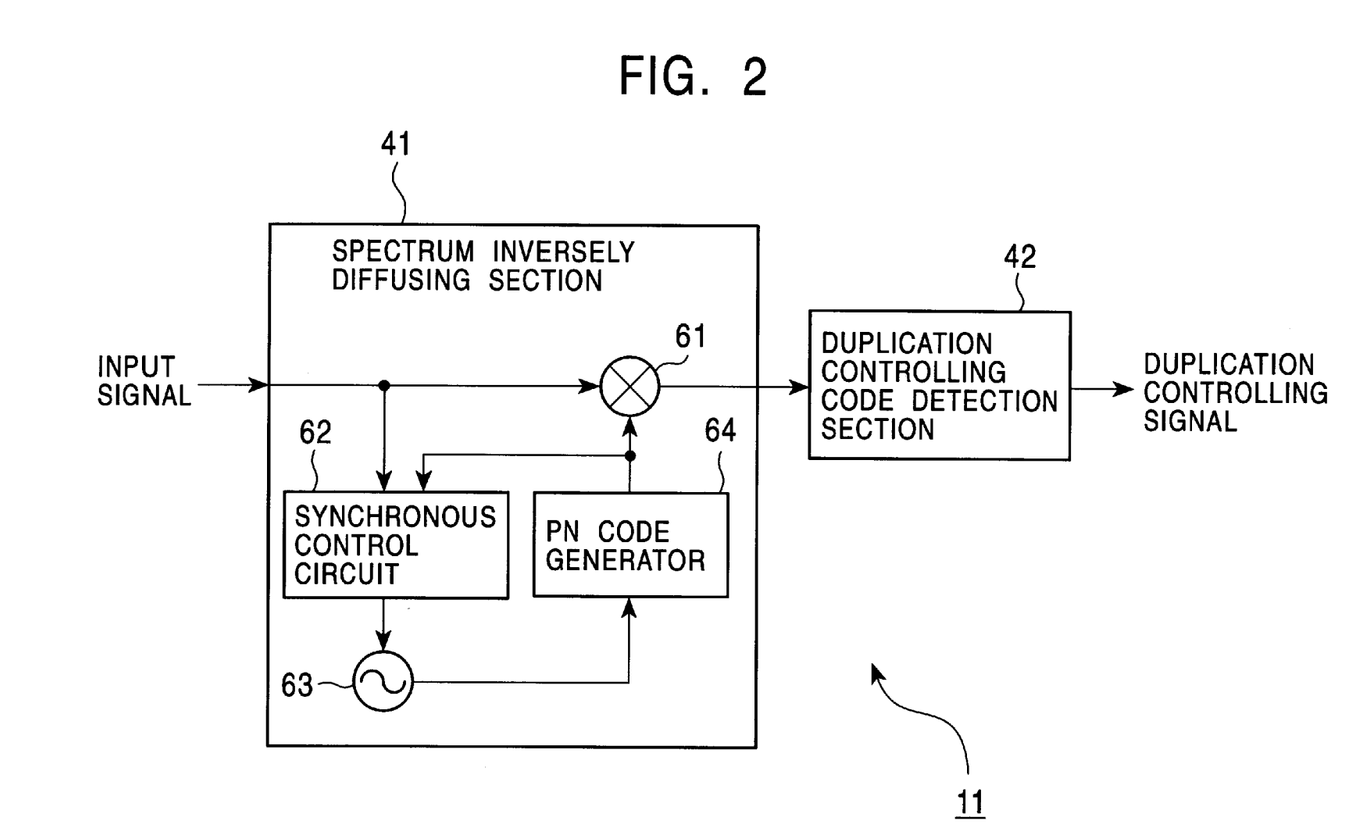
FIG. 2 is a block diagram showing the structure of the digital watermark detection circuit shown in FIG. 1.

FIG. 2 is a block diagram showing the structure of the digital watermark detection circuit 11. The analog signal supplied to the digital watermark detection circuit 11 is supplied to a spectrum inversely diffusing section 41. The spectrum inversely diffusing section 41 is composed of a multiplier 61, a synchronous control circuit 62, an oscillator 63 and a pseudo-noise (PN) code generator 64.

The analog signal supplied to the spectrum inversely diffusing section 41 is inputted to the multiplier 61 and the synchronous control circuit 62. A PN code is supplied to the multiplier 61 and the synchronous control circuit 62 from the PN code generator 64.

The synchronous control circuit 62 extracts a timing signal from the PN code by utilizing a fact that the PN code has a sharp autocorrelation nature, and supplies the extracted timing signal to the oscillator 63. The oscillator 63 outputs an output signal, the oscillation frequency and the phase of which are controlled in reference to the timing signal supplied from the synchronous control circuit 62, to the PN code generator 64.

The PN code generator 64 generates the PN code in reference to the output signal supplied from the oscillator 63, and supplies the generated PN code to the multiplier 61 and the synchronous control circuit 62. As the PN code, an M-series (a maximum length series), a GOLD code or the like is used.

The multiplier 61 multiplies the PN code supplied from the PN code generator 64 by the analog signal supplied to the digital watermark detection circuit 11 to decode a duplication controlling code the spectrum of which is diffused in the analog signal. The multiplier 61 then supplies the decoded a duplication controlling code to the duplication controlling code detecting section 42.

The duplication controlling code is a code composed of, for example, two bits for indicating the control regarding duplication as the following.

00: duplicable
01: duplicable for only one generation
10: undefined
11: prohibition of duplication The duplication controlling code detecting section 42 generates a duplication controlling signal corresponding to the value of the duplication controlling code supplied from the spectrum inversely diffusing section 41, and supplies the generated duplication controlling signal to the record controlling circuit 13.

The recording circuit 12 performs the analog-digital (A/D) conversion of the inputted analog signal under the control of the record controlling circuit 13 to generate a digital data corresponding to the inputted analog signal. The generated digital data is transformed to a coded signal suitable for recording to the recording medium 3. At the same time, a data for correcting errors is added to the generated digital data, and the digital data is supplied to a recording drive 15.

The recording circuit 12 detects a discontinuity of the inputted analog signal owing to the amount of the variation of the synchronizing signal larger than a predetermined threshold value at which the time code, i.e. data indicating an hour, a minute and a second of a frame, becomes discontinuous, a change of audio signal from monaural to stereo, or the like. The recording circuit 12 outputs a predetermined signal to the record controlling circuit 13 when the discontinuity is detected.

The record controlling circuit 13 stores a flag indicating the prohibition of recording or a state possible to record in the memory 18 in reference to the duplication controlling signal supplied from the digital watermark detection circuit 11, a value of a counter indicating a time passed from the beginning of a predetermined process in the record controlling circuit 13, or a signal supplied from the recording drive 15 and indicating whether the recording medium 3 is loaded or not. The record controlling circuit 13 controls the beginning or the stopping of recording of the recording circuit 12 and the recording drive 15 in reference to a signal supplied from a user control circuit 14, or the flag stored in the memory 18 and indicating the prohibition of recording or the state possible to record.

In addition, the record controlling circuit 13 stores an address on the recording medium 3 corresponding to the discontinuity of an analog signal in reference to an address on the recording medium 3 where the recording drive 15 started recording, an address on the recording medium 3 where the recording drive 15 stopped recording, and a signal supplied from the recording circuit 12.

The record controlling circuit 13 stores a flag indicating the prohibition of recording in the memory 18 and stops the recording of the recording circuit 12 and the recording drive 15 when a duplication controlling signal indicating the prohibition of duplication is supplied from the digital watermark detection circuit 11. Furthermore, when a duplication controlling signal indicating the prohibition of duplication is supplied from the digital watermark detection circuit 11 to the record controlling circuit 13, the record controlling circuit 13 makes the recording drive 15 set a predetermined data recorded in the recording medium 3 to be in a state that reproducing is prohibited in reference to an address of the recording medium 3, which is stored in the memory 18 and where the recording drive 15 began to record, an address of the recording medium 3, which is stored in the memory 18 and where the recording drive 15 stopped recording, and an address of the recording medium 3 stored in the memory 18 and corresponding to an discontinuity of an analog signal.

Or, when a duplication controlling signal indicating the prohibition of duplication supplied from the digital watermark detection circuit 11 to the record controlling circuit 13, the record controlling circuit 13 makes the recording drive 15 erase a predetermined data recorded in the recording medium 3 in reference to an address of the recording medium 3 stored in the memory 18 and where the recording drive 15 began to record, an address of the recording medium 3 stored in the memory 18 and where the recording drive 15 stopped recording, and an address of the recording medium 3 stored in the memory 18 and corresponding to a discontinuity of an analog signal.

Or, the record controlling circuit 13 makes the recording drive 15 eject the recording medium 3 when the duplication controlling signal indicating the prohibition of duplication supplied from the digital watermark detection circuit 11.

When a flag indicating the prohibition of duplication is stored in the memory 18, the record controlling circuit 13 prohibits the recording circuit 12 and the recording drive 15 from beginning to record even if a signal requiring recording to the recording medium 3 is inputted from the user control circuit 14.

When the record controlling circuit 13 stores the flag indicating the prohibition of recording in the memory 18 in response to the supply of the duplication controlling signal indicating the prohibition of duplication from the digital watermark detection circuit 11, the record controlling circuit 13 starts a counter equipped in the record controlling circuit 13, which counter indicates the passage of time from a point of time when the flag indicating the prohibition of recording is stored.

The record controlling circuit 13 stores a flag indicating a state possible to record in the memory 18 when a counted value of the counter in the record controlling circuit 13, which counter indicates the passage of time from the point of time when the flag indicating the prohibition of recording is stored, becomes equal to or more than a predetermined value, namely when it passes a predetermined time.

As described above, the record controlling circuit 13 stores the history information of recording. Furthermore, it is possible to make the record controlling circuit 13 prohibit recording for a predetermined time while it displays the prohibition of duplication when it is instructed to record a signal which is prohibited to be duplicated by a plurality of times continuously. The predetermined time may be different from the period of time from the reception of the prohibition flag to the point of time when recording is allowed, or may be set to be longer than the period.

Furthermore, the record controlling circuit 13 stores the flag indicating the state possible to record in the memory 18 when a signal indicating the ejection of the recording medium 3 from the recording drive 15 is supplied.

When the flag indicating the state possible to record is stored in the memory 18, the record controlling circuit 13 starts the recording circuit 12 and the recording drive 15 recording when a signal requesting to record to the recording medium 3 is inputted from the user control circuit 14.

The user control circuit 14 supplies a signal for displaying a predetermined character or a predetermined image on the display section 17 in reference to a signal supplied from the input section 16 or a value of a flag supplied from the record controlling circuit 13 and stored in the memory 18. Furthermore, the user control circuit 14 outputs a signal indicating a start of recording, a stop of recording or the like to the record controlling circuit 13 according to a signal supplied from the input section 16.

The recording drive 15 records a digital data in a predetermined format supplied from the recording circuit 12 to the recording medium 3 loaded on the recorder 1 under the control of the record controlling circuit 13. Furthermore, the recording drive 15 ejects the recording medium 3 loaded on the recorder 1 under the control of the record controlling circuit 13.

Operation buttons for recording or stopping are arranged on the input section 16 that outputs a signal corresponding to an operation of the buttons by a user to the user control circuit 14.

The display section 17 is composed of a liquid crystal display or the like for displaying a predetermined character, a predetermined image or the like in reference to a signal supplied from the user control circuit 14.

The memory 18 stores a flag indicating the prohibition of recording or a state possible to record, an address on the recording medium 3 where the recording drive 15 begins to record, an address of the recording medium 3 where the recording medium 3 stops recording, and an address of the recording medium 3 corresponding to a discontinuity of an analog signal under the control of the record controlling circuit 13.

Figure 3:
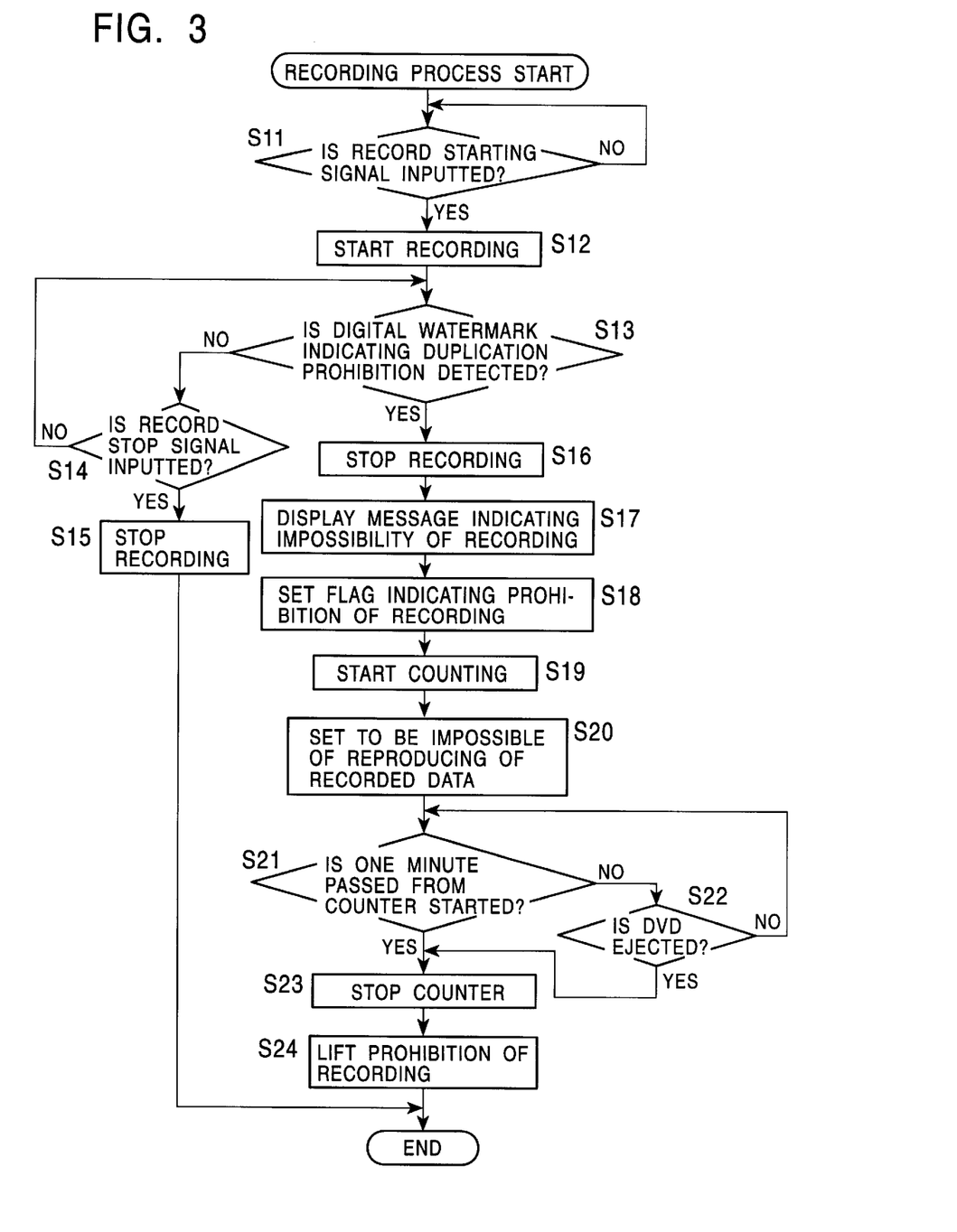
FIG. 3 is a flow chart for illustrating the recording process of the embodiment shown in FIG. 1.

Next, the flow chart shown in FIG. 3 is referred while the record process executed by the record controlling circuit 13 in conformity with a control program stored in the record controlling circuit 13 in advance will be described.

At step S11, the control program determines whether a signal indicating a start of recording is inputted or not from the user control circuit 14. At the step S11, when it is determined that the signal indicating the start of recording is not inputted yet, the record process returns to the step S11, and the determination is repeated until the signal indicating the start of recording is inputted.

At the step S11, if it is determined that the signal indicating the start of recording is inputted, the control program advances to step S12, and the control program makes the recording circuit 12 and the recording drive 15 start recording. The record controlling circuit 13 stores the address on the recording medium where the recording drive 15 begins to record in the memory 18.

The record controlling circuit 13 stores an address of the recording medium 3 corresponding to a discontinuity of an analog signal in the memory 18 when a signal indicating the discontinuity of the analog signal is supplied from the recording circuit 12 while the record controlling circuit 13 make the recording circuit 12 and the recording drive 15 record.

At step S13, it is determined whether a digital watermark having a value indicating the prohibition of duplication is detected from an inputted analog signal or not in reference to an duplication controlling signal supplied from the digital watermark detection circuit 11. At step S13, when it is determined that the digital watermark duplication having the value indicating the prohibition of duplication is not detected, namely when any digital watermark is not detected or when an digital watermark having a value except for the value indicating the prohibition of duplication is detected, the control program goes to step S14.

At the step S14, the control program determines whether a signal indicating the stop of recording is inputted from the user control circuit 14 or not. At the step S14, if it is determined that the signal indicating the stop of recording is not inputted, the control program returns to the step S13 and repeats the process of the detection of the digital watermark.

At the step S14, if it is determined that the signal indicating the stop of recording is inputted, the control program advances to step S15 and makes the recording circuit 12 and the recording drive 15 stop recording. And then, the recording process is completed.

At the step S13, if it is determined that the digital watermark having the value indicating the stop of duplication is detected, the control program advances to step S16 and makes the recording circuit 12 and the recording drive 15 stop recording. The record controlling circuit 13 stores the address on the recording medium 3 where the recording is stopped in the memory 18.

At step S17, the control program controls the user control circuit 14 to display a message indicating the impossibility of recording on the display section 17. At step S18, the control program stores a flag indicating the prohibition of recording in the memory 18.

At step S19, the control program starts the counter in the record controlling circuit 13 counting. At step S20, the control program sets the data recorded in the recording medium 3 loaded in the recording drive 15 to be impossible of reproducing in reference to the address on the recording medium 3 stored in the memory 18 from which the recording drive 15 begins to record and the address of the recording medium 3 stored in the memory 3 at which the recording drive 15 stops recording.

At step S21, the control program determines whether it passes a minutes from the counter in the record controlling circuit 13 started counting in reference to the value of the counter. At the step S21, if it is determined that it does not pass one minute yet from the start of counting of the counter, the control program advances to step S22. At the step S22, the control program determines whether the recording medium 3 is ejected or not from the recording drive 15 in reference to a signal from the recording drive 15. At the step S22, if it is determined that the recording medium 3 is not ejected from the recording drive 15, the control program returns to the step S21 and repeats the process of determining the passage of time from the start of the counter.

At the step S21, if it is determined that one minutes passes from the start of the counter, or if it is determined that the recording medium 3 is ejected from the recording drive 15 at the step S22, the control program advances to step S23, and stops the counter in the record controlling circuit 13. At step S24, the control program releases the prohibition of recording. That is, the control program stores a flag indicating a state possible to record in the memory 18, and then the process is completed.

As described above, the recorder 1 stops recording when the digital watermark indicating the prohibition of duplication is detected from an analog signal, and the recorder 1 prohibits recording for a predetermined period or until the recording medium 3 is ejected. When the recorder 1 detects an digital watermark indicating the prohibition of duplication from an analog signal, the recorder 1 sets the data recorded in the recording medium 3 till the detection of the digital watermark to be impossible of reproducing.

Accordingly, even if the recorder 1 is made to repeat the operation of recording the analog signal in which the digital watermark indicating the prohibition of duplication is inserted, the repetition of the operation takes a lot of time. Consequently, it takes a very long time to record the whole of the analog signal supplied from the reproducer 2. Therefore, it is substantially impossible to record the analog signal in which the digital watermark indicating the prohibition of duplication is inserted.

Furthermore, even if the recorder 1 recorded the whole of the analog signal supplied from the reproducer 2, it is impossible to reproduce the data recorded in the recording medium 3.

Incidentally, at the step S20, the control program may erase the data that is recorded in the recording medium 3 till that time.

Furthermore, at the step S20, the control program may erase the data that is recorded in the recording medium 3 till that time, and then the control program may eject the recording medium 3 from the recording drive 15.

In the determination of the passage of time at the step S20, the time based on the determination is not limited to one minute, and it may be set as an appropriate time within for example from one minute to five minutes.

Figure 4:
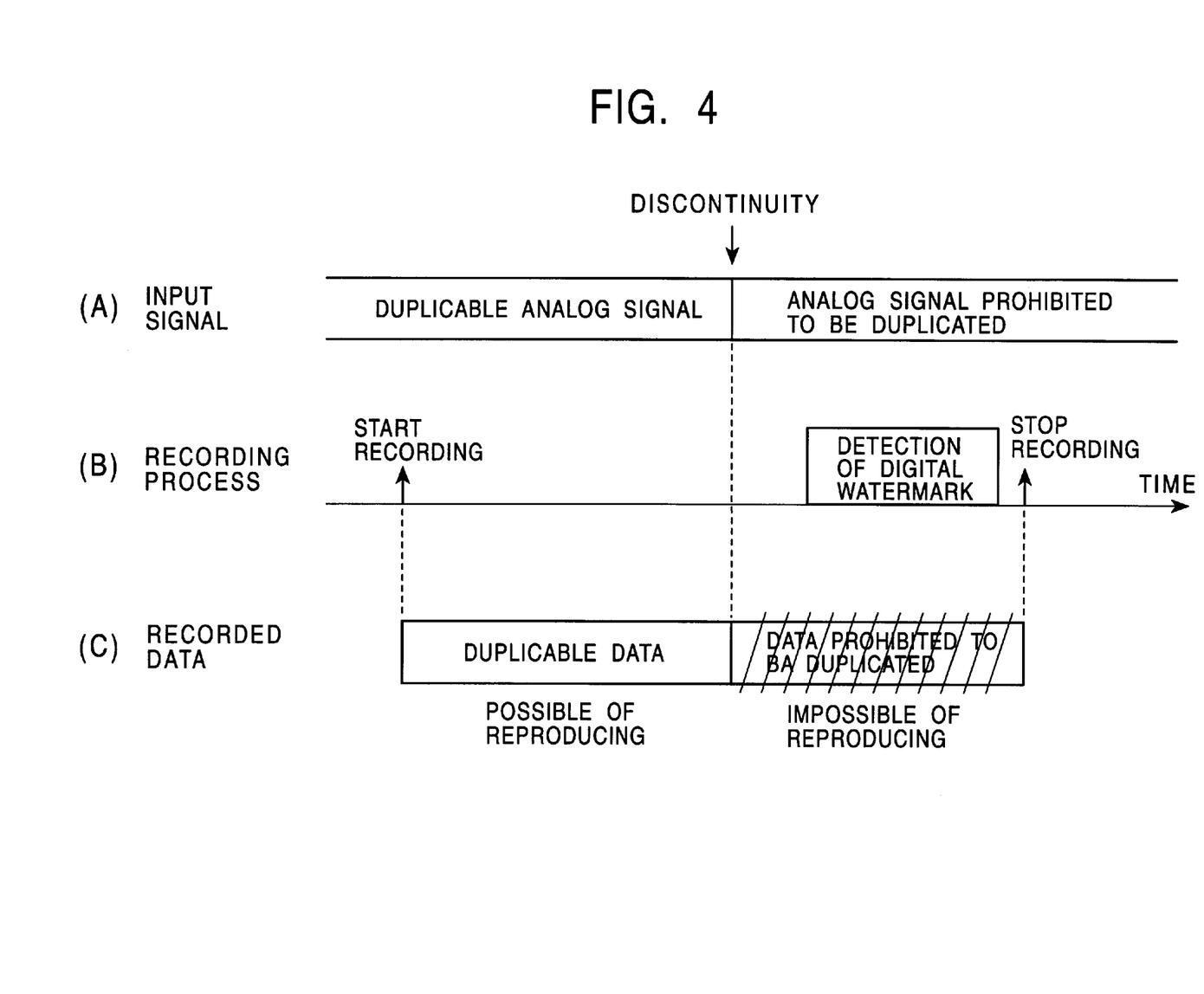
FIG. 4 is a diagram for illustrating the operation of a recording apparatus of another embodiment of a recording system according to the present invention.

FIG. 4 is a diagram for illustrating the operation of a recorder 1 of another embodiment of a recording system according to the present invention when the reproducer 2 supplies a duplicable analog signal to the recorder 1 for a predetermined period of time, and then the reproducer 2 supplied an analog signal prohibits to be duplicated to the recorder 1.

As shown in FIG. 4(A), when an analog signal supplied to the recorder 1 from the reproducer 2 changes from a duplicable analog signal to an analog signal prohibited to be duplicated, there is produced a discontinuity owing to the amount of the variation of the synchronizing signal larger than a predetermined threshold value at which the time code, i.e. data indicating an hour, a minute and a second of a frame, becomes discontinuous, a change of an audio from monaural to stereo, or the like.

As shown in FIG. 4(B), the recorder 1 stops recording when a digital watermark is detected in an analog signal prohibited to be duplicated. Furthermore, as shown in FIG. 4(C), the recorder 1 sets a data that is recorded in the recording medium 3 from the point of time when an discontinuity in an analog signal is detected to the point of time when the recording is stopped to be impossible of reproducing.

As described above, even if the reproducer 2 supplies a signal in which a duplicable analog signal and an analog signal prohibited to be duplicated are mixed to the recorder 1, it is possible to make the recorder 1 not reproduce the data corresponding to the analog signal prohibited to be duplicated surely.

Next, the process of the recorder 1 when the recorder 1 executes the operation shown in FIG. 4 will be described.

Figure 5:
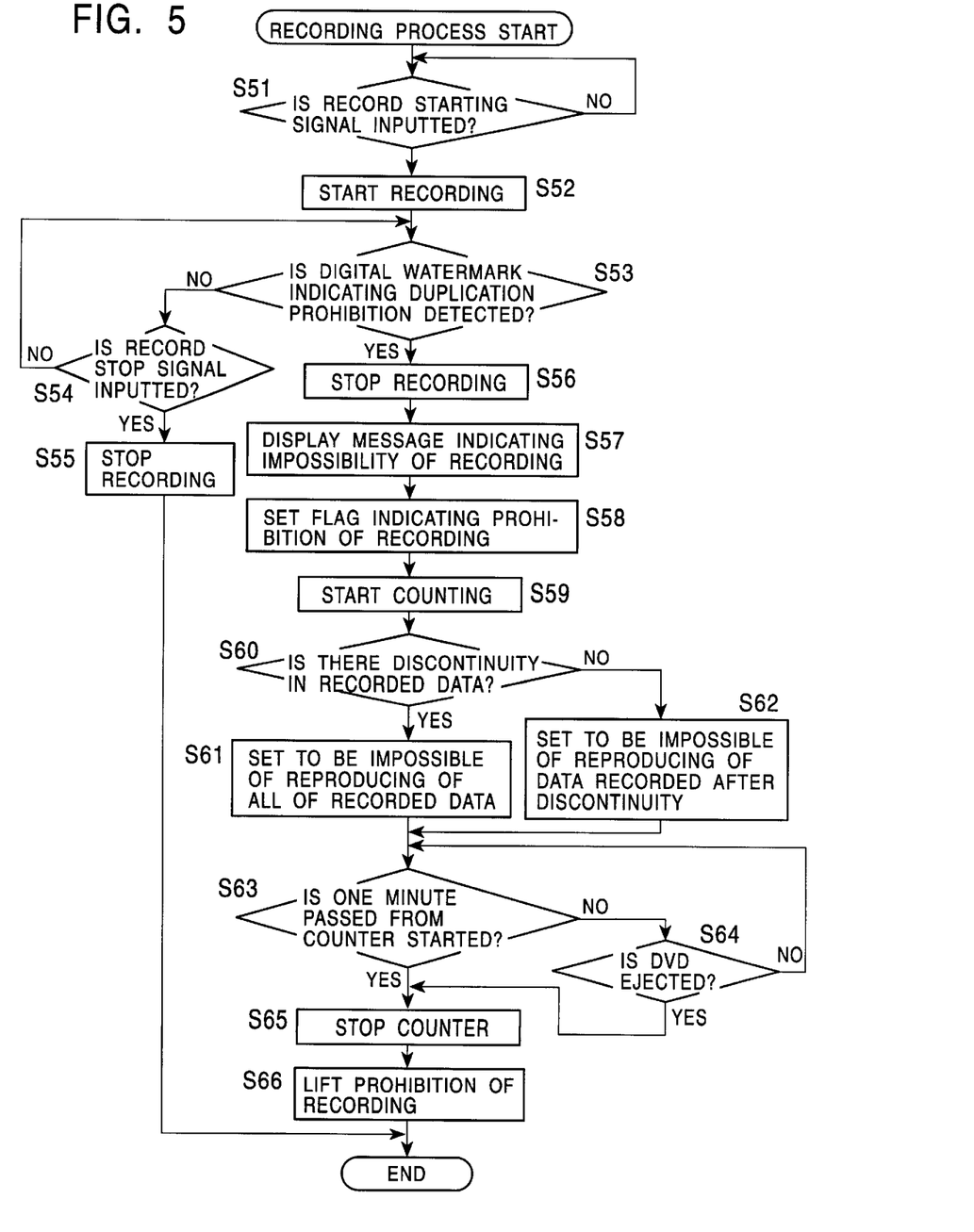
FIG. 5 is a flow chart for illustrating another recording process in accordance with the operation of FIG. 4.

FIG. 5 is a flow chart for illustrating the recording process in accordance with the operation described in reference to FIG. 4, which recording process is executed by the record controlling circuit 13 under a control program stored in the record controlling circuit 13 in advance.

Because the processes of steps S51–S59 is similar to those of the steps S11–S19 shown in FIG. 3, respectively, the descriptions about them are omitted.

At step S60, the control program determines whether there is any discontinuity in a data recorded in the recording medium 3 or not in reference to a data recorded in the memory 18. If it is determined that there is no discontinuity in a data recorded in the recording medium 3 at the step S60, the control program advances to step S61 because all data recorded in the recording medium 3 are prohibited to be duplicated. At the step S61, the control program makes the recording drive 15 set all of the data recorded in the recording medium 3 from the start of recording to the stop of recording to be impossible of reproducing in reference to the address of the recording medium 3 stored in the memory 18 from which the recording drive 15 begins to record and the address of the recording medium 3 stored in the memory 18 at which the recording derive 15 stops recording, and then the control program advances to the step S63.

When it is determined that there is any discontinuity in the data recorded in the recording medium 3 at the step S60, the control program advances to step S62 because the data after the discontinuity are prohibited to be recorded. At the step S62, the control program makes the recording drive 15 set the data recorded in the recording medium 3 after the discontinuity in an analog signal to be impossible of reproducing in reference to the address of the recording medium 3 stored in the memory 18 and corresponding to the discontinuity of the analog signal, and the address of the recording medium 3 stored in the memory 18 at which recording was stopped. And then the control program advances to step S63.

Processes of steps S63–S66 are similar to those of the steps S21–S24 shown in FIG. 3, respectively, the descriptions about them are omitted.

As described above, the recorder 1 prohibits recording only of the analog signals in which the digital watermark having a value indicating the prohibition of duplication is inserted. In addition, the recorder 1 prohibits reproducing the data corresponding to the analog signals in which the digital watermark having a value indicating the prohibition of duplication is inserted.

At step S61, it may be applicable that the control program makes the recording drive 15 erase all of the data recorded in the recording medium 3 from the start of recording to the stop of recording. Furthermore, at step S62, it may be applicable that the control program makes the recording drive 15 erase the data recorded in the recording medium 3 after the discontinuity.

As described above, a recording system according to the present invention can surely prevent an analog signal, in which the digital watermark having a value indicating the prohibition of duplication is inserted, from being duplicated, even if recording operations are repeated.

Incidentally, in the above description, it is supposed that the digital watermark the spectrum of which is diffused is inserted in an analog signal. However, the present invention is not limited to the use of the digital watermark the spectrum of which is diffused. It may be applicable that by inserting a signal indicating the prohibition of duplication such as a signal used for the so-called copy guard in an analog signal and the recorder 1 detects the signal indicating the prohibition of duplication for performing the similar processes.

Furthermore, the signal is not limited to the analog signal. It may applicable that the reproducer 2 inputs digital data in which the digital watermark is inserted and the recorder 1 detects the digital watermark inserted in the digital data for performing the similar processes. The aforesaid series of processes can be executed by either of the hardware and the software.

When the series of the processes are executed by the software, programs constitute the software are installed in a computer incorporated into the dedicated hardware or for example an all-purpose personal computer, which can execute various functions by various programs installed therein, from a recording medium.

The recording medium is composed of not only a packaged medium that is distributed for providing a program stored therein to a user separately from a computer as shown in FIG. 7 such as a magnetic disk 351, which includes a floppy disk, an optical disk 352, which includes a Compact Disc-Read Only Memory (CD-ROM) and a Digital Versatile Disc (DVD), an photomagnetic disk 353, which includes a Mini-Disk™ (MD), and a semiconductor memory 354, but also a Read Only Memory (ROM) 302 and a hard disk included in the memorizing section 308 that are provided to a user in a state of being incorporated in a computer in advance and in which a program is stored.

Figure 6:
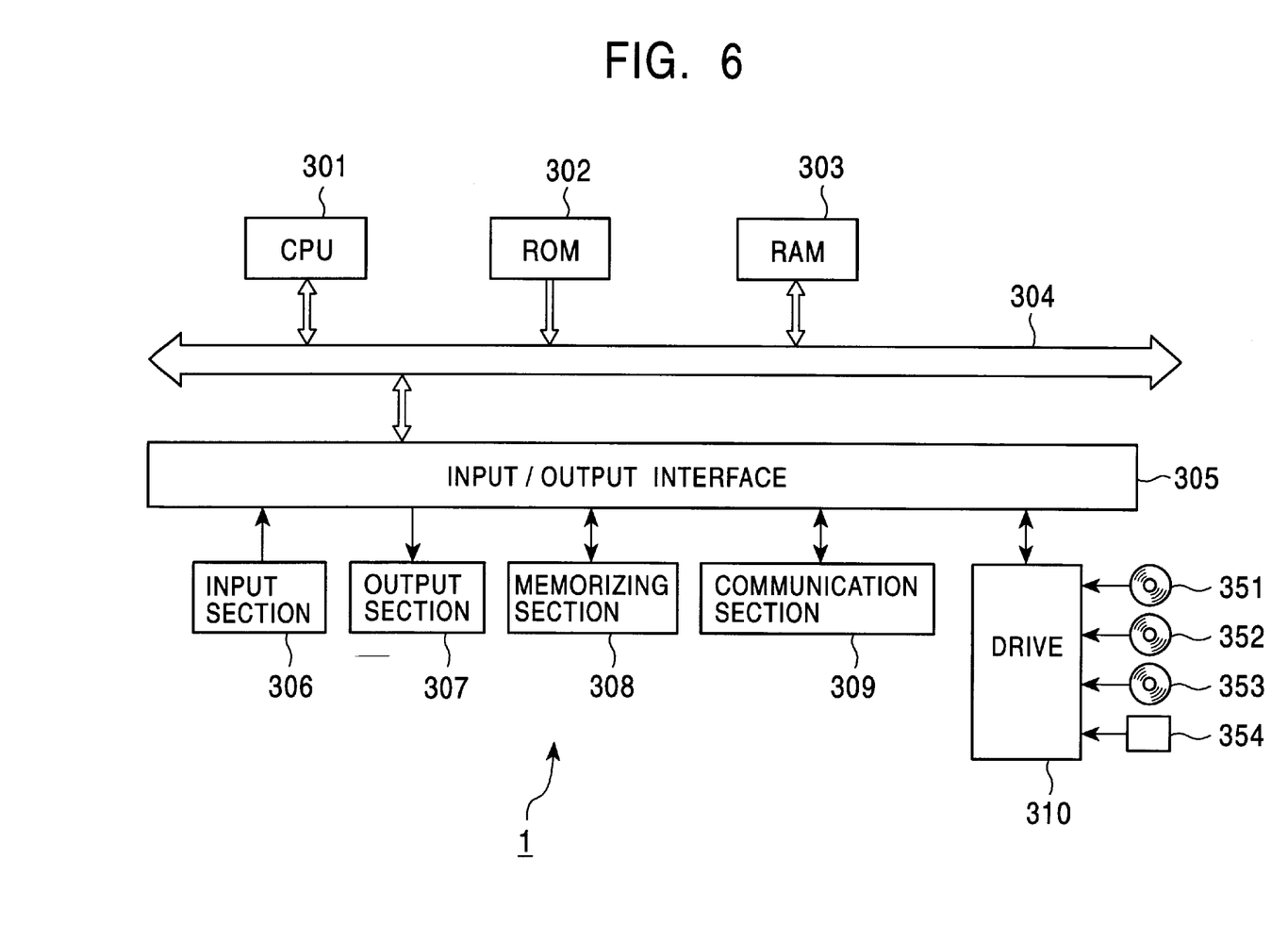
FIG. 6 is a diagram for illustrating embodiments of a recording medium according to the present invention.

The recorder 1 has a Central Processing Unit (CPU) 301 built-in as shown in, for example, FIG. 6. An input/output interface 305 is connected with the CPU 301 through a bus 304. When an instruction is inputted into the CPU 301 from the input section 306 composed of a keyboard and/or a mouse through the input/output interface 305 by a user, the CPU 301 executes a program stored in the ROM 302 in accordance with the instruction. Or, the CPU 301 loads into a Random Access Memory (RAM) 303 a program stored in the hard disk included in the memorizing section 308 in advance, a program that was transmitted from a satellite or a network and was received by the communication section 309 and then was installed into the hard disk, or a program that was read out of the magnetic disk 351, the optical disk 352, the photomagnetic disk 353 or the semiconductor memory 354 that are loaded in the drive 310 and was installed in the hard disk, and then the CPU 301 executes them. Furthermore, the CPU 301 outputs a data corresponding to the results of its processing to the output section 307 composed of a Liquid Crystal Display (LCD) or the like through the input/output interface 305 as the need arises.

In the present description, the steps composing the program to be stored in the recording medium are executed time-serially in the described order. However, the time-serial processing is not always necessary, and processes may be executed in parallel or separately.

Furthermore, in the present description, the term "system" means a whole apparatus composed of a plurality of apparatus.

Although the invention has been described in its preferred form with a certain degree of particularity, obviously many changes and variations are possible therein. It is therefore to be understood that the present invention may be practiced otherwise than as specifically described herein without departing from the scope and the sprit thereof.

What is claimed is:

1. A recording apparatus for recording an input signal on an information recording medium, said recording apparatus comprising:

recording means for recording the input signal on the information recording medium;

detecting means for detecting a duplication controlling signal for controlling duplication inserted in the input signal; and record controlling means for controlling said recording means to stop recording when the duplication controlling signal detected by said detecting means indicates prohibition of recording on the information recording medium and then to prohibit recording on the information recording medium for a first predetermined time, said record controlling means storing a history of recording instructions and resuming recording after a second predetermined time passes or when a prescribed condition is fulfilled, in case of receiving the recording instructions a plurality of times in spite of the prohibition of recording;

whereby when recording of an input signal is initiated, a start address is recorded in a memory and indicates the address on said information recording medium where recording of said input signal is begun, whereby when said duplication controlling signal indicates prohibition of recording, recording is stopped and a stop address is recorded in said memory and indicates an address on said information recording medium where recording of said input signal is ended, and whereby said start address and said stop address are used in an operation that prevents reproduction of a signal recorded in any location between said start address and said stop address.

2. A recording apparatus according to claim 1, wherein said first predetermined time during which recording is prohibited by said record controlling means and a second predetermined time from receiving said recording instructions a plurality of times till resuming recording are different from each other.

3. A recording apparatus according to claim 1, wherein said detecting means detects a digital watermark as said duplication controlling signal.

4. A recording apparatus according to claim 1, wherein said record controlling means controls said recording means to eject said information recording medium from said recording apparatus when said detecting means detects said duplication controlling signal indicating prohibition of duplication.

5. A recording apparatus according to claim 1, wherein said record controlling means controls said recording means to release said prohibition of recording when said information recording medium is ejected from said recording apparatus.

6. A recording apparatus according to claim 1, wherein said record controlling means controls said recording means to set a signal recorded in said information recording medium from beginning of recording to stopping of the recording to prohibition of reproducing when said detecting means detects said duplication controlling signal indicating prohibition of duplication.

7. A recording apparatus according to claim 1, further comprising discontinuity finding means for finding a discontinuity of said input signal after a start of recording, wherein said record controlling means controls said recording means to set a signal recorded in said information recording medium from a point of time when the discontinuity is found to stopping of recording to prohibition of reproducing when said detecting means detects said duplication controlling signal indicating prohibition of duplication.

8. A recording apparatus according to claim 1, wherein said record controlling means controls said recording means to erase a signal recorded in said information recording medium from beginning of recording to stopping of the recording when said detecting means detects said duplication controlling signal indicating prohibition of duplication.

9. A recording apparatus according to claim 1, further comprising discontinuity finding means for finding a discontinuity of said input signal after a start of recording, wherein said record controlling means controls said recording means to erase a signal recorded in said information recording medium from a point of time when the discontinuity is found to stopping of recording when said detecting means detects said duplication controlling signal indicating prohibition of duplication.

10. A method for recording an input signal on an information recording medium, said method comprising the steps of:

recording the input signal on the information recording medium;

detecting a duplication controlling signal for controlling duplication in the input signal; and controlling said step of recording to stop recording when the duplication controlling signal detected in said step of detecting indicates prohibition of recording on the information recording medium and then to prohibit recording on the information recording medium for a first predetermined time, said step of controlling storing a history of recording instructions and resuming recording after a second predetermined time passes or when a prescribed condition is fulfilled, in case of receiving the recording instructions a plurality of times in spite of the prohibition of recording;

whereby when recording of an input signal is initiated, a start address is recorded in a memory and indicates the address on said information recording medium where recording of said input signal is begun, whereby when said duplication controlling signal indicates prohibition of recording, recording is stopped and a stop address is recorded in said memory and indicates an address on said information recording medium where recording of said input signal is ended, and whereby said start address and said stop address are used in an operation that prevents reproduction of a signal recorded in any location between said start address and said stop address.

11. A recording medium on which a program for a recording process of recording an input signal on an information recording medium is recorded and that can be read out by a computer where said recording medium is loaded, said program comprising the steps of:

recording the input signal on the information recording medium;

detecting a duplication controlling signal for controlling duplication in the input signal; and controlling said step of recording to stop recording when the duplication controlling signal detected in said step of detecting indicates prohibition of recording on the information recording medium and then to prohibit recording on the information recording medium for a first predetermined time, said step of controlling storing a history of recording instructions and resuming recording after a second predetermined time passes or when a prescribed condition is fulfilled, in case of receiving the recording instructions a plurality of times in spite of the prohibition of recording;

whereby when recording of an input signal is initiated, a start address is recorded in a memory and indicates the address on said information recording medium where recording of said input signal is begun, whereby when said duplication controlling signal indicates prohibition of recording, recording is stopped and a stop address is recorded in said memory and indicates an address on said information recording medium where recording of said input signal is ended, and whereby said start address and said stop address are used in an operation that prevents reproduction of a signal recorded in any location between said start address and said stop address.

12. A recording apparatus for recording an input signal on an information recording medium, said recording apparatus comprising:

recording means for recording the input signal on the information recording medium;

detecting means for detecting a digital watermark signal in the input signal; and record controlling means for controlling said recording means to stop recording when a duplication controlling signal extracted from the detected digital watermark signal indicates prohibition of recording on the information recording medium and then to prohibit reproducing a signal recorded by said recording means or to erase the signal;

whereby when recording of an input signal is initiated, a start address is recorded in a memory and indicates the address on said information recording medium where recording of said input signal is begun, whereby when said duplication controlling signal indicates prohibition of recording, recording is stopped and a stop address is recorded in said memory and indicates an address on said information recording medium where recording of said input signal is ended, and whereby said start address and said stop address are used in an operation that prevents reproduction of a signal recorded in any location between said start address and said stop address.

13. A recording apparatus according to claim 12, wherein said record controlling means controls said recording means to prohibit recording for a predetermined time when said duplication controlling signal indicates said prohibition of recording on said information recording medium.

14. A method for recording an input signal on an information recording medium, said method comprising the steps of:

recording the input signal on the information recording medium;

detecting a digital watermark signal in the input signal; and controlling said step of recording to stop recording when a duplication controlling signal extracted from the detected digital watermark signal indicates prohibition of recording on the information recording medium and then to prohibit reproducing a signal recorded by said step of recording or to erase the signal;

whereby when recording of an input signal is initiated, a start address is recorded in a memory and indicates the address on said information recording medium where recording of said input signal is begun, whereby when said duplication controlling signal indicates prohibition of recording, recording is stopped and a stop address is recorded in said memory and indicates an address on said information recording medium where recording of said input signal is ended, and whereby said start address and said stop address are used in an operation that prevents reproduction of a signal recorded in any location between said start address and said stop address.

15. A method according to claim 14, wherein said step of controlling controls said step of recording to prohibit recording for a predetermined time when said duplication controlling signal indicates said prohibition of recording on said information recording medium.

* * * * *